(12) United States Patent
Dettinger et al.

(10) Patent No.: US 7,992,010 B2
(45) Date of Patent: *Aug. 2, 2011

(54) SECURE DATABASE ACCESS THROUGH PARTIAL ENCRYPTION

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 390 days.

This patent is subject to a terminal disclaimer.

(21) Appl. No.: 12/198,743

(22) Filed: Aug. 26, 2008

(65) Prior Publication Data

US 2009/0083548 A1 Mar. 26, 2009

Related U.S. Application Data

(63) Continuation of application No. 10/388,074, filed on Mar. 13, 2003, now Pat. No. 7,418,600.

(51) Int. Cl.
*G06F 11/30* (2006.01)
(52) U.S. Cl. ........................ 713/189; 713/193
(58) Field of Classification Search .................. 713/189, 713/193
See application file for complete search history.

(56) References Cited

U.S. PATENT DOCUMENTS

| | | | |
|---|---|---|---|
| 5,734,887 A | 3/1998 | Kingberg et al. | |
| 5,956,400 A | 9/1999 | Chaum et al. | |
| 6,553,368 B2 | 4/2003 | Martin et al. | |
| 6,671,687 B1 | 12/2003 | Pederson et al. | |
| 6,725,227 B1 | 4/2004 | Li | |
| 6,785,810 B1 | 8/2004 | Lirov et al. | |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,096,229 B2 | 8/2006 | Dettinger et al. | |
| 7,228,416 B2 | 6/2007 | Nishizawa et al. | |
| 7,418,600 B2 * | 8/2008 | Dettinger et al. | 713/193 |
| 2002/0078068 A1 | 6/2002 | Krishnaprasad et al. | |

(Continued)

FOREIGN PATENT DOCUMENTS

EP 0990972 4/2000

(Continued)

OTHER PUBLICATIONS

Office Action History of U.S. Appl. No. 10/388,074 dates ranging from Aug. 17, 2006 to Mar. 18, 2008.

(Continued)

*Primary Examiner* — Jacob Lipman
(74) *Attorney, Agent, or Firm* — Patterson & Sheridan, LLP

(57) ABSTRACT

The present invention generally is directed to systems, methods, and articles of manufacture for securing sensitive information involved in database transactions. Embodiments of the present invention selectively encrypt only portions of transactions involving sensitive data, thereby reducing or eliminating the processing overhead resulting from wastefully encrypting non-sensitive data. The sensitive data may be identified by a document. The document may be accessed by a requesting entity to determine which portions of a query should be encrypted prior to sending the query to a database server over a network. The document may also be accessed by a database server to determine which portions of query results should be encrypted prior to sending the query results to the requesting entity over the network.

7 Claims, 11 Drawing Sheets

U.S. PATENT DOCUMENTS

| | | | |
|---|---|---|---|
| 2002/0104002 A1 | 8/2002 | Nishizawa et al. |
| 2002/0157023 A1 | 10/2002 | Callahan et al. |
| 2004/0181679 A1 | 9/2004 | Dettinger et al. |
| 2005/0044366 A1 | 2/2005 | Pucheral et al. |
| 2008/0148070 A1 | 6/2008 | Dettinger et al. |
| 2008/0148071 A1 | 6/2008 | Dettinger et al. |

FOREIGN PATENT DOCUMENTS

| | | |
|---|---|---|
| EP | 1193588 | 4/2002 |
| WO | 03014888 | 2/2003 |

OTHER PUBLICATIONS

Office Action History of U.S. Appl. No. 12/036,076 dates ranging from Apr. 2, 2010 to Feb. 4, 2011.

Office Action History of U.S. Appl. No. 12/036,116 dates ranging from May 28, 2010 to Feb. 10, 2011.

PCT International Search Report dated Aug. 12, 2004 for International App. No. PCT/GB2004/000936 (cited in parent application—U.S. Appl. No. 10/388,074).

* cited by examiner

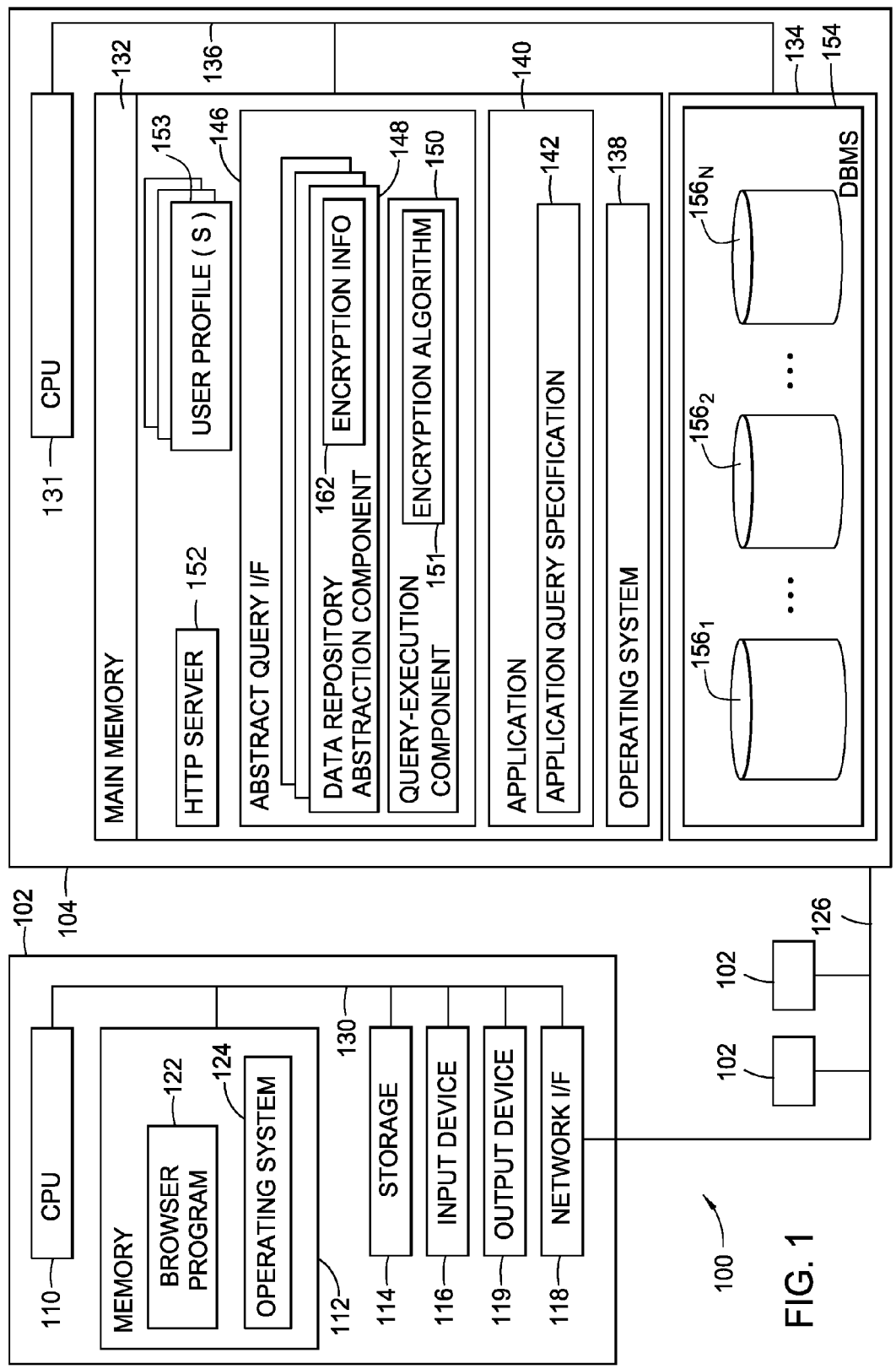

QUERY BUILDER

FILE   EDIT   VIEW   FAVORITES   TOOLS   HELP

Address  C:\work\Patents\Query Builder.htm

Query Builder

User: Researcher 1        Security Level: 2
Search: Unnamed

Search Conditions

Action            NOT                              Condition

Delete            ☐         ( Test = Hemoglobin )
Delete   AND      ☐         ( Location = Rochester )
Add Condition   Group   Ungroup Results Delete   Patient ID < ENC >
Delete   Hemoglobin Test Results
Delete   Date of Test

[RUN] [SAVE] [CANCEL]

□ QUERY BUILDER      _ 🗗 ✕

FILE    EDIT    VIEW    FAVORITES    TOOLS    HELP

⇦ ⇨ ↻ 🏠 ⊗    🔍 🖨

Address   C:\work\Patents\Query Builder.htm ▷

🔍 Query Builder

User: Researcher 1      Security Level: 2
Search: Unnamed

Query Results

Displaying rows 1 to 2 of 2

| Patient ID | Hemoglobin | Date |
|---|---|---|
| <ENC> | 9 | 10/12/2002 |
| <ENC> | 10 | 12/04/2002 |

Double click on a row to retrieve a full list of tests performed for the patient.

[BACK] [Forward]

[OK] [Save Results]     Send To: [SAS Print ▷] [Go]

FIG. 4B

QUERY BUILDER

FILE  EDIT  VIEW  FAVORITES  TOOLS  HELP

Address: C:\work\Patents\Query Builder.htm

Query Builder

User: Researcher 1  
Search: Unnamed

Security Level: 1

Query Results

Displaying rows 1 to 2 of 2

| Patient ID | Hemoglobin | Date |
|---|---|---|
| 1 | 10 | 12/04/2002 |
| 2 | 9 | 10/12/2002 |

Double click on a row to retrieve a full list of tests performed for the patient.

BACK  Forward

OK  Save Results

Send To: SAS Print  Go

FIG. 4C

SECURE DATABASE ACCESS THROUGH PARTIAL ENCRYPTION

CROSS-REFERENCE TO RELATED APPLICATIONS

This application is a continuation of U.S. patent application Ser. No. 10/388,074, filed Mar. 13, 2003 now U.S. Pat. No. 7,418,600, which is herein incorporated by reference in its entirety.

BACKGROUND OF THE INVENTION

1. Field of the Invention

The present invention generally relates to data processing and more particularly to methods of secure access to a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One significant issue in the context of databases is security. Databases often contain confidential or otherwise sensitive material which require a degree of security to be protected from access. For example, medical records are considered highly personal and confidential. As such, access to medical records is typically restricted to selected users. Other examples of sensitive material include, but are certainly not limited to, credit card numbers and personal identification numbers (PINs) used to conduct financial transactions, and employee records. To this end, conventional database management systems often implement user profiles which specify a level of authority. Whether a user may access some particular data will depend upon the user's level of authority specified in their respective profile.

However, through the use of intrusive hacking techniques (snooping, spoofing, and other forms of eavesdropping), unauthorized people may still gain access to sensitive information by intercepting database queries or query results containing the sensitive information. This problem is compounded by the fact that the high level languages used to generate queries are, by design, highly readable (e.g., to facilitate the building, interpreting, and troubleshooting of queries). In other words, because queries and results are often transmitted over a network as highly readable "text on wire," sensitive material contained therein may be readily identified if intercepted by an unauthorized user.

One technique to secure sensitive material within database transactions is through the use of protocols commonly used for secure transmission of data over the Internet, such as Secure Sockets Layer (SSL) or Secure HyperText Transfer Protocol (S-HTTP). Such protocols take an all or nothing approach, encrypting entire documents, or an entire session's worth of transactions. However, because many database queries return vast amounts of data (possibly thousands of results records), encrypting the entire set of results may place an undue burden on system resources. Particularly in cases where only a small fraction of the results needs to be secured (e.g., a 16 character credit card number, a patient identification number, etc.), encrypting the entire results would be wasteful.

Accordingly, there is a need for an improved method for securing sensitive information in a database transaction.

SUMMARY OF THE INVENTION

The present invention generally provides methods, articles of manufacture, and systems for securing sensitive information in a database transaction.

For some embodiments, a method for generating a secure document generally includes providing a first document containing security attributes for one or more fields for use in generating a second document, the security attributes identifying whether a corresponding one of the fields is sensitive, generating the second document including one or more of the fields, and encrypting portions of the second document involving fields identified as sensitive in the first document.

For some embodiments, a method for conducting a secure database transaction generally includes receiving query results from a server, the query results containing both encrypted and unencrypted data, identifying the encrypted data, and presenting at least the unencrypted data to a user.

For some embodiments, a method for conducting a secure database transaction generally includes building a query having one or more conditions, each condition involving one or more fields, determining, for each of the conditions, whether the condition involves sensitive fields, and encrypting conditions determined to involve sensitive fields.

For some embodiments, a method for conducting a secure database transaction generally includes receiving a query from a requesting entity, issuing the query against a database, receiving results in response to issuing the query, determining whether the results includes data corresponding to one or more sensitive fields, if so, encrypting the data corresponding to the one or more sensitive fields, and sending the query results to the requesting entity.

For some embodiments, the article of manufacture generally includes a computer-readable medium containing a program which, when executed by a processor, performs operations for conducting a secure database transaction. The operations generally include generating a query having one or more conditions, each condition involving one or more fields, determining, for each of the conditions, whether the condition involves sensitive fields, and encrypting conditions determined to involve sensitive fields.

For some embodiments, the article of manufacture generally includes a computer-readable medium containing a program which, when executed by a processor, performs operations for conducting a secure database transaction. The operations generally include receiving a query from a requesting entity, issuing the query against a database, receiving results in response to issuing the query, determining whether the results includes data corresponding to one or more sensitive fields, if so, encrypting the data corresponding to the one or more sensitive fields, and, sending the query results to the requesting entity.

For some embodiments a database system generally includes a database, a requesting entity and an executable component (e.g., a server process). The executable component is generally configured to a) receive a query from the requesting entity, b) issue the query against the database, c) determine if results received in response to issuing the query against the database contain data corresponding to one or more sensitive fields, d) if so, encrypt the data corresponding to the one or more sensitive fields, and e) send the results to the requesting entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a computer system illustratively utilized in accordance with the present invention.

FIGS. 4A-4D illustrate exemplary graphical user interface (GUI) screens in accordance with the present invention.

DETAILED DESCRIPTION OF THE PREFERRED EMBODIMENTS

Figure 2A:
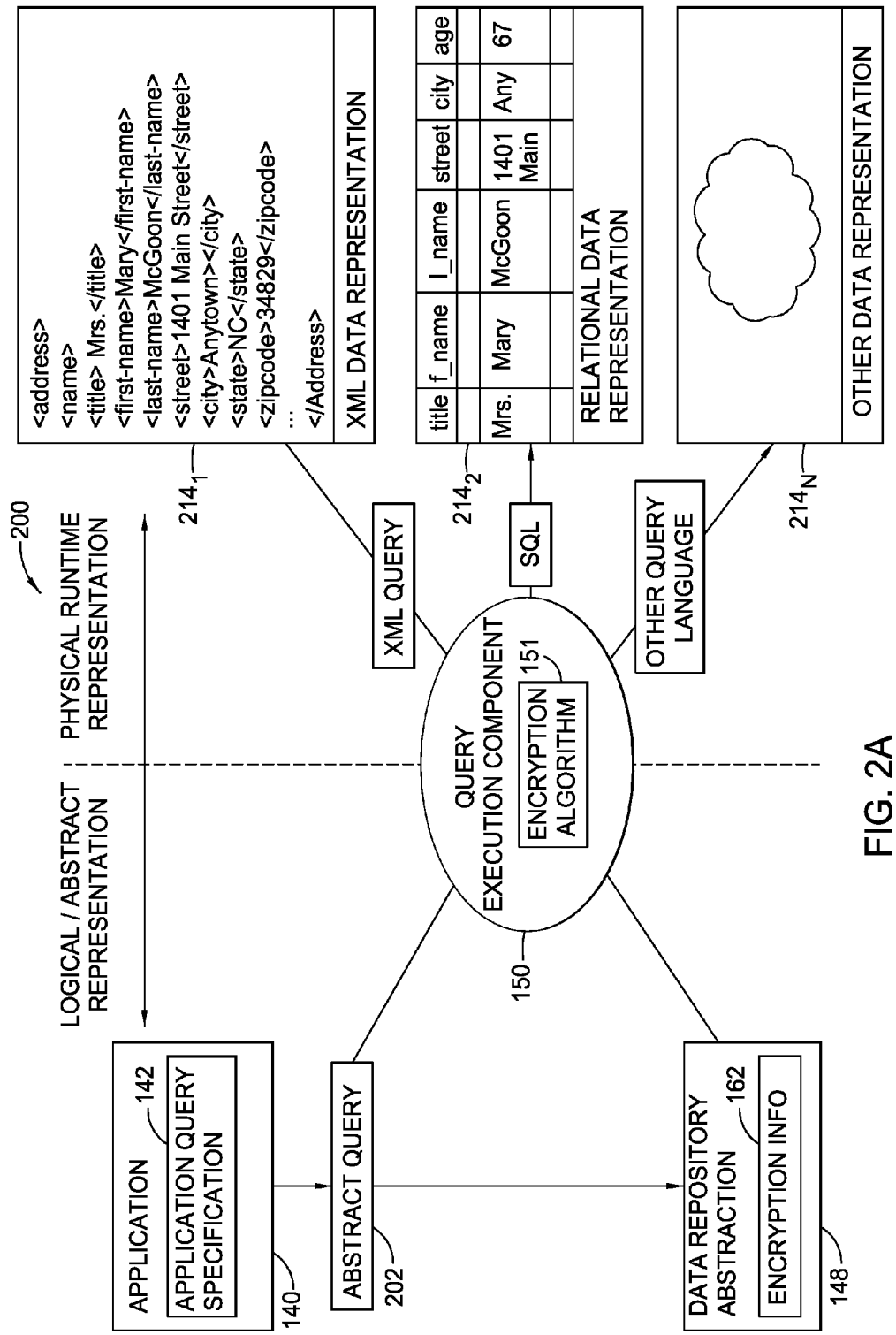
FIGS. 2A-2C are relational views of software components of one embodiment of the present invention.

The present invention generally is directed to systems, methods, and articles of manufacture for securing sensitive information involved in database transactions. Rather than take the conventional "all or nothing" approach to securing entire transactions (e.g., encrypting entire database queries and results), embodiments of the present invention selectively encrypt only portions of transactions involving sensitive data, thereby reducing or eliminating the processing overhead resulting from wastefully encrypting non-sensitive data.

According to some embodiments, a document containing security attributes which identify sensitive fields (e.g., fields that hold sensitive information) is provided. Entities involved in transactions may access this document to determine what data to encrypt. For example, a requesting application may access the document to determine which portions of a query to encrypt while a database server may access the document to determine which portions of query results to encrypt. As used herein, the term document generally refers to any file produced by an application. Accordingly, a document may contain human readable text (generated by a word processor or other type editor), machine readable data, or any data in any other type of format. For some embodiments, queries and/or results may be contained within a document. In the following description, to facilitate understanding, embodiments of the present invention will be described with reference to XML documents as a specific, but not limiting example of a type of document that may contain security attributes for fields involved in a database transaction.

A wide variety of types of information may be regarded as sensitive. As an example, patient identification (ID) numbers may be regarded as sensitive information in the context of query results. With the patient ID, remaining query results may have context. For example, a sensitive test result may be related to the particular patient for which it corresponds. On the other hand, if the patient ID is removed (or secured such that only authorized users can view it), the remaining data becomes merely statistical in nature. In other words, the only valuable information that can be determined from the data without the patient ID is in context to the rest of the data, which may be useful for many applications, such as conducting medical research. For example, without the patient ID, a researcher may be able to determine that 20% of the patients in a sample have been diagnosed with cancer, but can not determine any one patient that has been diagnosed.

Of course, the medical field is just one application environment in which aspects of the present invention may be used to advantage. Another example is a human resources application where large amounts of sensitive employee information (e.g., salary, performance, etc.) may be transmitted across a network in database transactions. By securing an employee ID, the remaining sensitive employee information may be transferred freely because, without the employee ID, the remaining employee information has no context. Another example is a marketing application, in which consumer transactions, tracked and recorded in a database, may be queried to conduct marketing research. The transaction records may contain sensitive information regarding consumers (e.g., credit card numbers, credit ratings, customer names, etc.), which may be secured allowing other information (e.g., items purchased, dates of purchases, etc.) to be freely transferred.

In one embodiment of the present invention, security features are implemented as part of an abstract (logical) model of data (or data abstraction model). The data abstraction model is implemented as a data repository abstraction (DRA) component containing a collection of abstract representations of fields of data contained in the repository it models. Thus, the DRA component provides a logical view of the underlying modeled data repository. In this way, data is made independent of the particular manner in which the data is physically represented. A query abstraction layer is also provided and is based on the data abstraction model. A runtime component (e.g., a query execution component) performs translation of abstract queries (generated based on the data abstraction model) into a form that can be used against a particular physical data representation. However, while the data abstraction model described herein provides one or more embodiments of the invention, persons skilled in the art will recognize that the concepts provided herein can be implemented without such a data abstraction model while still providing the same or similar results.

An Exemplary Environment

One embodiment of the invention is implemented as a program product for use with a computer system such as, for example, the networked computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) non-writable storage media (e.g., read-only memory devices within a computer such as CD-ROM disks readable by a CD-ROM drive) having information permanently stored thereon; and (ii) writable storage media (e.g., floppy disks within a diskette drive or hard-disk drive) having alterable information stored on. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

FIG. 1 depicts a block diagram of the networked computer system 100 in which embodiments of the present invention may be implemented. In general, the system 100 includes a client (e.g., user's) computer 102 (three such client computers 102 are shown) and at least one server 104. The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any program (preferably GUI-based) capable of rendering the information transmitted to the client computer 102 from the server 104. For some embodiments, the browser program 122 may enable a user to conduct database transactions (e.g., build and issue queries) with the server 104, for example, via one or more GUI screens that form a query building interface. In other words, queries issued by the client 102 may be sent to the server 104 over the network 126 (and results from the query will be sent from the server 104 to the client 102), thus prompting the need to secure sensitive information involved in the transaction.

The server 104 may be physically arranged in a manner similar to the client computer 102. Accordingly, the server 104 is shown generally comprising a CPU 131, a memory 132, and a storage device 134, coupled to one another by a bus 136. Memory 132 may be a random access memory sufficiently large to hold the necessary programming and data structures that are located on the server 104.

The server 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the server 104. When read and executed by one or more processors 131 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database (e.g., databases $156_1$, $156_2 \ldots 156_N$, collectively referred to as databases 156). For some embodiments, one of more of the applications 140 and/or the abstract query interface 146 may interact with various software components of the client 102, such as the browser program 122, allowing the client 102 to issue queries against the databases 156.

Illustratively, the databases 156 are shown as part of a database management system (DBMS) 154 in storage 134. The databases 156 are representative of any collection of data regardless of the particular physical representation. By way of illustration, the databases 156 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed/executed using logical fields defined by the abstract query interface 146. The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety.

As described in the above referenced application, the logical fields used in the abstract queries are defined by a data repository abstraction (DRA) component 148 of the abstract query interface 146. The abstract queries are executed by a query execution component 150 which first transforms the abstract queries into a form consistent with the physical representation of the data contained in the DBMS 154. In one embodiment, the DRA component 148 is configured with encryption information 162. For embodiments not based on the data abstraction model (or some equivalent thereof), the encryption information 162 may reside elsewhere. As will be described in more detail below, the encryption information 162 may identify fields within the databases 156 that contain sensitive information and should, therefore, be encrypted.

The query execution component 150 operates to perform various analyses and, in some embodiments, implement various security features, such as encrypting sensitive information contained within a query or results, or take other actions according the results of the analyses performed. Accordingly, the query execution component 150 is shown configured with an encryption algorithm 151 (which may be representative of a plurality of algorithms), which implements the methods described herein. In general, the security features described herein may be applied to a particular user, a group of users, or all users.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 152 (e.g., a web server) adapted to service requests from the client computer 102. For example, the server process 152 may respond to requests to access the database(s) 156, which illustratively resides on the server 104. Incoming client requests for data from a database 156 invoke an application 140. When executed by the processor 131, the application 140 causes the server 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the http server process 152 shown in FIG. 1 is merely illustrative and other embodiments adapted to support any known and unknown protocols are contemplated.

Logical/Runtime View of Environment

Figure 2B:
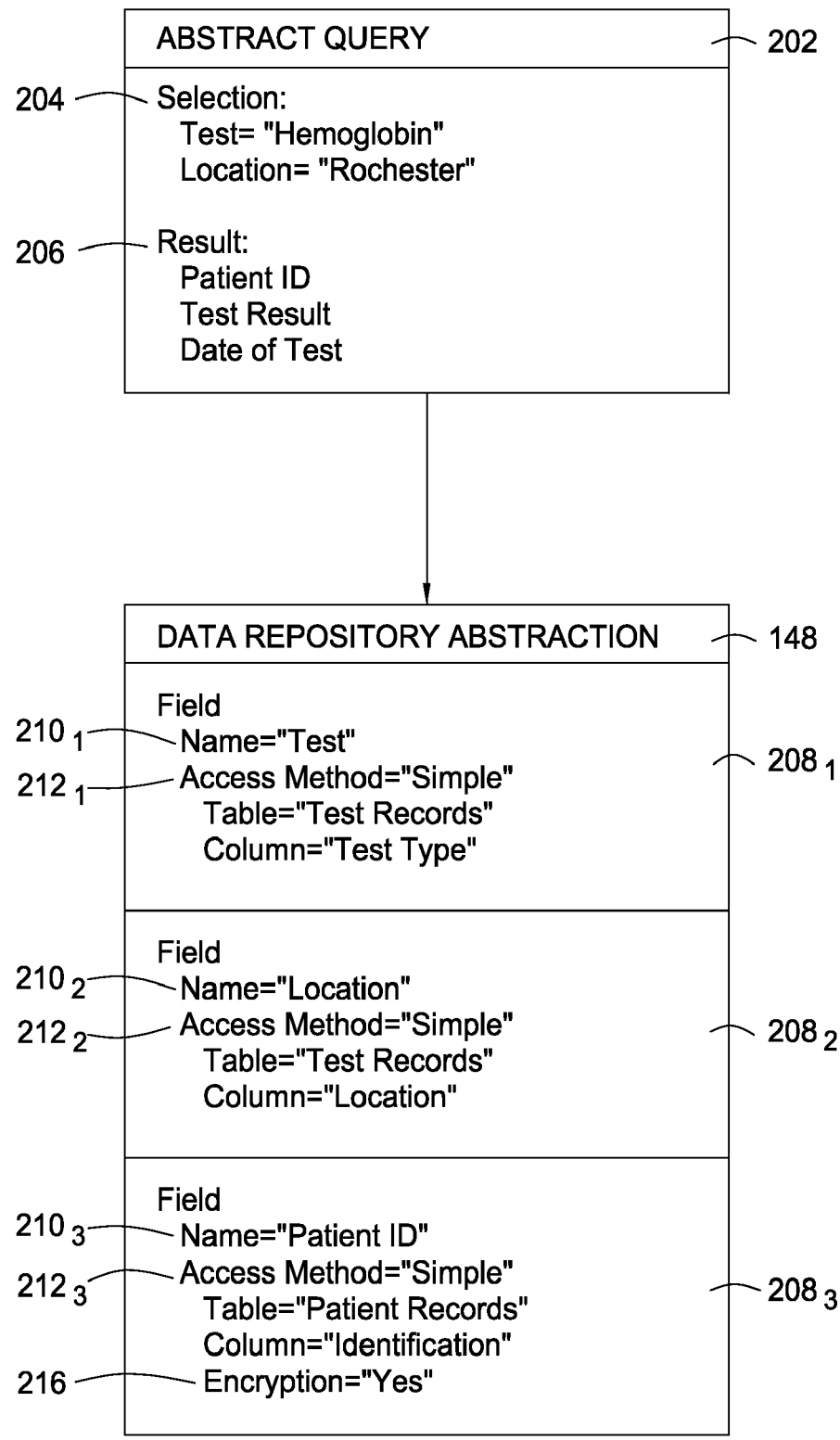
Figure 2C:
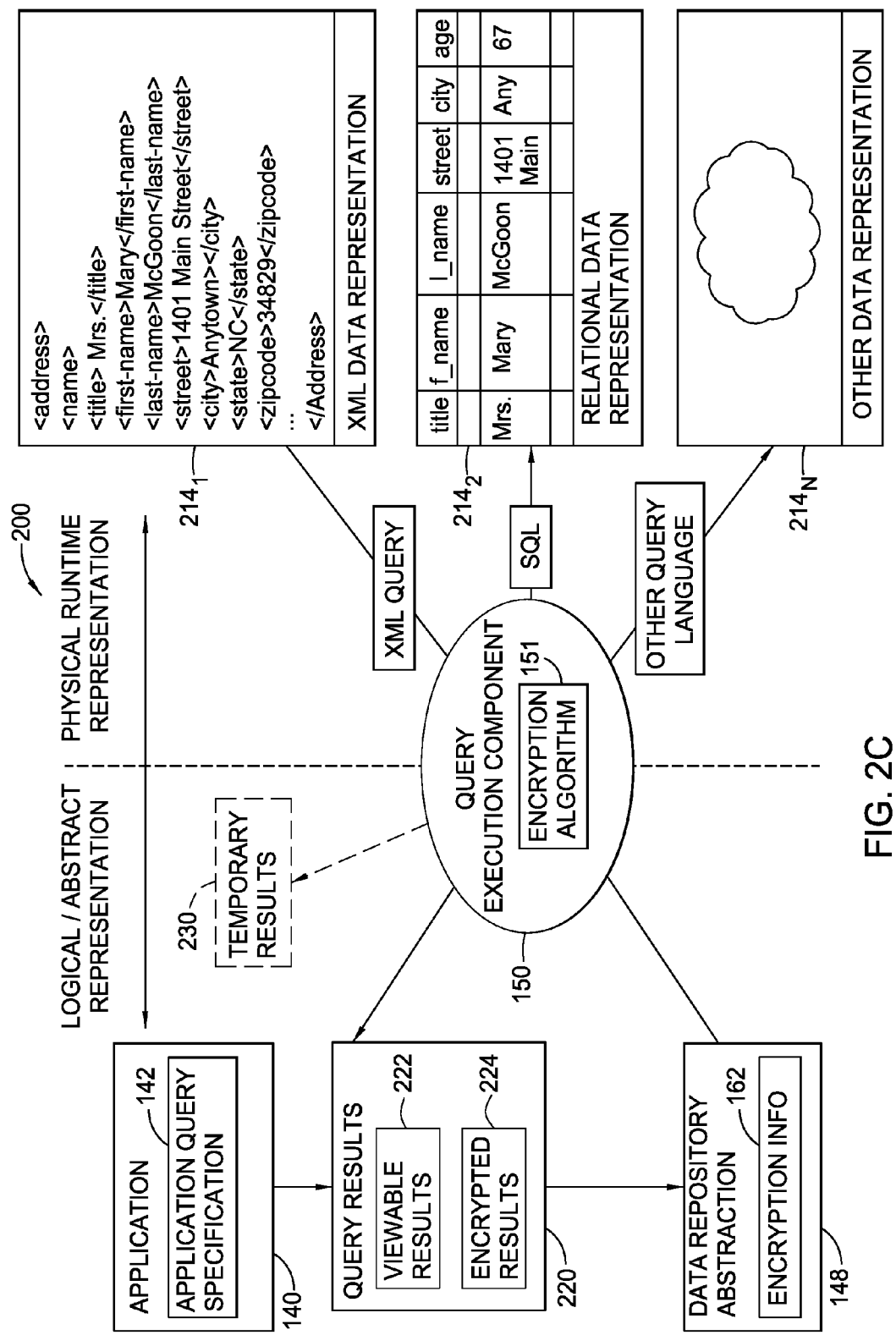

FIGS. 2A-C illustrate relational views of components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the previously described DBMS 154. As a result, abstract queries may be defined that are independent of the particular underlying data representation used.

FIG. 2B shows one example of the abstract query 202. As illustrated, the abstract query 202 may include both criteria (e.g., query conditions) used for data selection (selection criteria 204) and an explicit specification of the fields to be returned (return data specification 206) based on the selection criteria 204, both of which may be specified in the application query specification 142. In the illustrated query, the selection criterion 204 includes two query conditions, "Test=Hemoglobin" and "Location=Rochester," while the return data specification 206 specifies three fields to return (from records matching the selection criterion), "PatientID," "Test Results," and "Date of Test." In other words, the abstract query is designed to return information (ID, test results, and date of test) regarding patients that had hemoglobin tests performed in Rochester.

An illustrative abstract query corresponding to the abstract query 202 shown in FIG. 2B is shown in Table I below. By way of illustration, the abstract query 202 is defined using XML. However, any other language may be used to advantage.

TABLE I

QUERY EXAMPLE

```
001 <?xml version="1.0"?>
002 <!--Query string representation: Test = "Hemoglobin" AND Location =
003 "Rochester"-->
004 <QueryAbstraction>
005         <Selection>
006             <Condition>
007         <Condition field="data://Test/Type" operator="EQ" value="Hemoglobin">
008             <Condition relOperator="AND" field="data://Test/Location" operator="EQ" >
```

TABLE I-continued

QUERY EXAMPLE

```
009                <Value val="Rochester"/>
010             </Condition>
011          </Selection>
012          <Results format="HTML" blockSize="25" distinct="Yes" >
013             <Field name="data://Demographic/Patent ID" fieldType="char"/>
014             <Field name="data://Test/Hemoglobin" fieldType="int"/>
015             <Field name="data://Test/Date" fieldType="date"/>
016          </Results>
017          <EntityRef name="Patient"/>
018 </QueryAbstraction>
```

Illustratively, the abstract query shown in Table I includes a selection specification (lines 5-11) containing selection criteria and a results specification (lines 12-16). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and formatting options, such as sorting criteria.

The logical fields specified by the application query specification 142 and used to compose the abstract query 202 are defined by the DRA component 148. In general, the DRA component 148 exposes information as a set of logical fields that may be used within a query (e.g., the abstract query 202) issued by the application 140 (which may be in response to user input query conditions) to specify criteria for data selection and specify the form of result data returned from a query operation. The logical fields are defined independently of the underlying data representation being used in the DBMS 154, thereby allowing queries to be formed that are loosely coupled to the underlying data representation.

In general, the DRA component 148 comprises a plurality of field specifications $208_1$, $208_2$, $208_3$, . . . (three shown by way of example), collectively referred to as the field specifications 208. Specifically, a field specification is provided for each logical field available for composition of an abstract query. In one embodiment, a field specification 208 comprises a logical field name $210_1$, $210_2$, $210_3$ (collectively, field name 210) and an associated access method $212_1$, $212_2$, $212_1$ (collectively, access method 212). The access methods 212 associate (i.e., map) the logical field names to a particular physical data representation $214_1$, $214_2$ . . . $214_N$ in a database (e.g., one of the databases 156). By way of illustration, two data representations are shown in FIG. 2A, an XML data representation $214_1$ and a relational data representation $214_2$. However, the physical data representation $214_N$ indicates that any other data representation, known or unknown, is contemplated.

In one embodiment, a single DRA component 148 contains field specifications (with associated access methods) for two or more physical data representations 214. In an alternative embodiment, a different single DRA component 148 is provided for each separate physical data representation 214. In yet another embodiment, multiple data repository abstraction components 148 are provided, where each DRA component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective DRA component 148.

Any number of access methods are contemplated depending upon the number of different types of logical fields to be supported. In one embodiment, access methods for simple fields, filtered fields and composed fields are provided. The field specifications $208_1$, $208_2$ and $208_3$ exemplify simple field access methods $212_1$, $212_2$ and $212_3$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("Test") to a column named "test_type" in a table named "test_records."

Filtered fields (no example shown in FIG. 2) identify an associated physical entity and provide rules used to define a particular subset of items within the physical data representation. An example of a filtered field is a New York ZIP code field that maps to the physical representation of ZIP codes and restricts the data only to those ZIP codes defined for the state of New York. Composed access methods (no example shown in FIG. 2) compute a logical field from one or more physical fields using an expression supplied as part of the access method definition. In this way, information which does not exist in the underlying data representation may be computed. An example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the DRA component 148 shown in FIG. 2 are representative of logical fields mapped to data represented in the relational data representation $214_2$. However, other instances of the DRA component 148 map logical fields to other physical data representations, such as XML.

Partial Encryption

In one embodiment, one or more of the field specifications 208 are configured with the encryption information 162 briefly described above with reference to FIGS. 1 and 2A. In the illustrated embodiment, only the field definition $208_3$ (for a "Patient ID" field) has associated encryption information 162. Accordingly, it should be understood that not all field definitions need necessarily include encryption information. In the present example, the encryption information 162 is an encryption attribute 216. As illustrated, the encryption attribute 216 may be assigned a Boolean value, for example, with YES (ENABLED, TRUE, 1, etc.) indicating the corresponding logical field is sensitive and should, therefore, be encrypted. It should be understood that the encryption attribute need not be designated in the DRA component 148, but could instead be a provided in a configuration file, for example.

As illustrated in FIG. 2C, based on the encryption information 162 (e.g., encryption attribute 216 for a logical field), query results 220 returned by the query execution component 150 may contain both viewable results 222 and encrypted results 224. Table II shows illustrative return results for the example query 202 shown in FIG. 2B. By way of illustration, the results include two rows of data (lines 2-13 and lines 14-25) and the return results are shown in XML. However, any other language may be used to advantage.

TABLE II

DATA REPOSITORY ABSTRACTION EXAMPLE

```
001 <data>
002     <row>
003         <col>
004             <EncryptedData xmlns="http://www.w3.org/2001/04/xmlenc#">
005                 <CipherData>
006                     <CipherValue>BNjivf7gTOhHmcfZIX8XJSxHJ7dlZudnZBrg =
007                     </CipherValue>
008                 </CipherData>
009             </EncryptedData>
010         </col>
011         <col>9</col>
012         <col>10/12/2002</col>
013     </row>
014     <row>
015         <col>
016             <EncryptedData xmlns="http://www.w3.org/2001/04/xmlenc#">
017                 <CipherData>
018                     <CipherValue>BNjivf7gTOhHmcfZIX8XJSxHJ7dlZudnZBrg=
019                     </CipherValue>
020                 </CipherData>
021             </EncryptedData>
022         </col>
023         <col>10</col>
024         <col>12/04/2002</col>
025     </row>
026 </data>
```

For some embodiments, in addition to (or in place of) a Boolean encryption attribute that indicates a field is sensitive, another security attribute, such as an integer value indicative of, for example, an authorized user group or user security level required for viewing encrypted results containing the sensitive data or query conditions involving a sensitive field. In operation, a list of user profiles 153 (a plurality of which are shown in FIG. 1) containing a security level (user ID, or user group) for individual users may be maintained. For some embodiments, the security level (or other type of user credentials) may be compared against this other type security attribute to determine whether query results containing a sensitive field, or query results involving the sensitive field, should be presented to the user in a viewable manner (decrypted/unencrypted).

Any type of suitable algorithm may be utilized to encrypt sensitive fields. For example, encryption algorithms based on public and private keys may be used to encrypt and decrypt, respectively, sensitive portions of database transactions. Examples of suitable encryption algorithms include, but are not limited to, RSA, DES, SHA, and MD5 algorithms. For some embodiments, the type of encryption algorithm may be specified in the DRA component 148, rather than utilizing a "hard coded" algorithm agreed upon by the server and requesting client. Thus, different algorithms may be specified in the DRA component 148 (e.g. as part of encryption information 162), which may enhance security, for example, further decreasing the likelihood an unauthorized viewer will be able to decrypt the sensitive portions.

As indicated by the encryption attribute 216 shown in FIG. 2B, the Patient ID field is sensitive and is, therefore, encrypted, as shown in lines 4-9 and lines 15-20. The other logical fields in the return results (test results in lines 11 and 23, date of test in lines 12 and 24) are returned unencrypted. Accordingly, even if the illustrated return results were intercepted, for example, by an unauthorized eavesdropper, the Patient ID would not be obtained and the remaining results would have no context and, therefore, little value outside statistical research. As will be described below, depending on the application, when the return results 220 are received by the requesting entity (e.g., the application 140 or the client browser program 122 shown in FIG. 1) the encrypted results may be decrypted and presented to the user in viewable form, may remain encrypted with an indication to the user that the results are encrypted, or may not be displayed to the user at all. Further, as will be described in greater detail below, in order to facilitate manipulation of query results (e.g., sorting, building related queries, etc.), encrypted results may be decrypted and stored as temporary results 230.

Exemplary Operations for Secure Database Transactions

For some embodiments, query conditions involving sensitive fields may also be encrypted, which may prevent sensitive information from being transmitted as text on wire. As previously described, even if sensitive information is encrypted in query results, the sensitive information may be provided by the query. As an example, a user may create a query to return certain test results (for example, the query may have the condition "PatientID=123456"). While a test results field may not be identified as a sensitive field, an unauthorized user that gains access to the query may readily identify the patient and may easily correlate the results of the query to the patient. Encrypting query conditions involving sensitive fields prevent this situation.

Figure 3A:
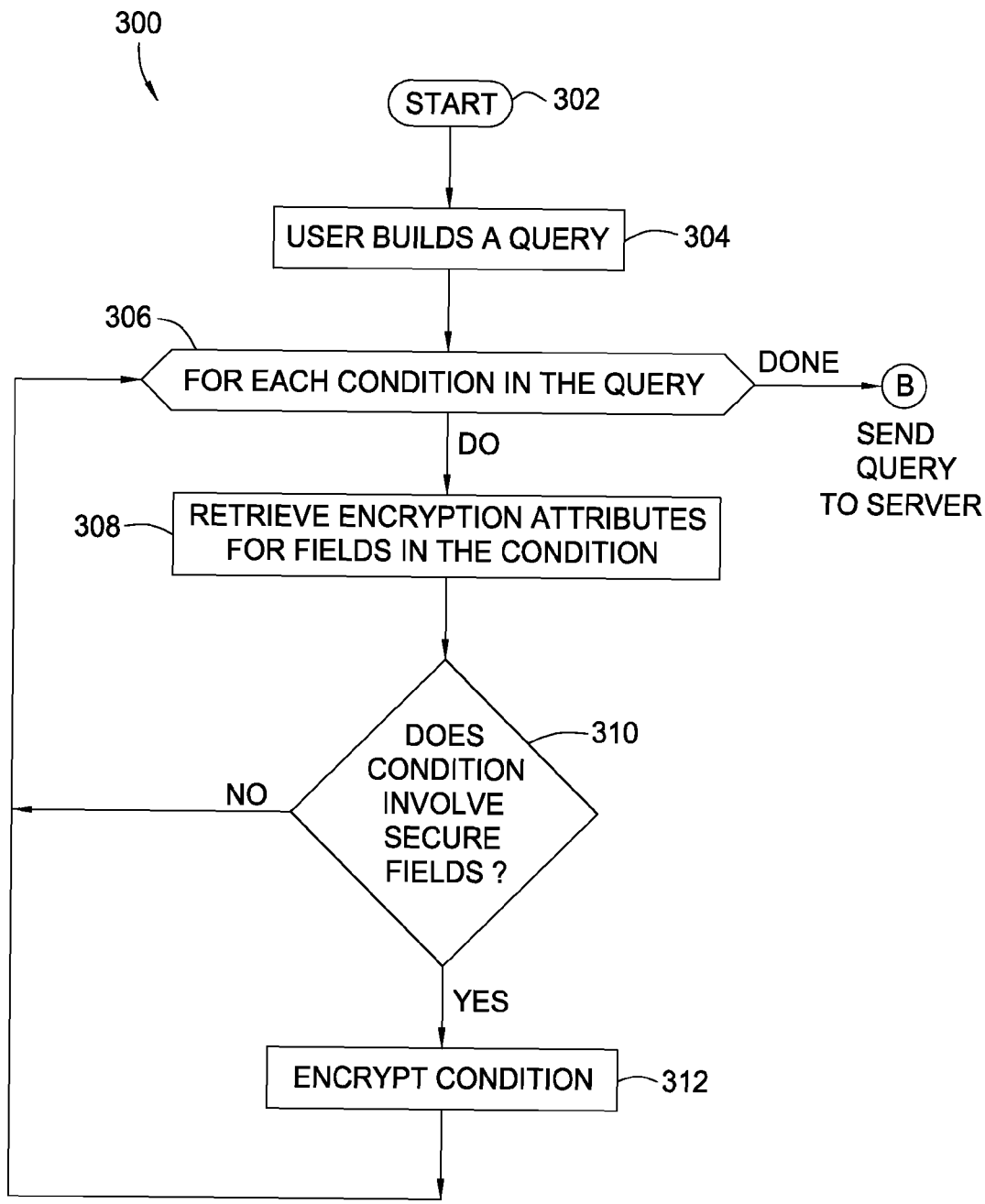
FIGS. 3A-3C are flow charts illustrating exemplary operations for securing sensitive information in accordance with the present invention.
Figure 3B:
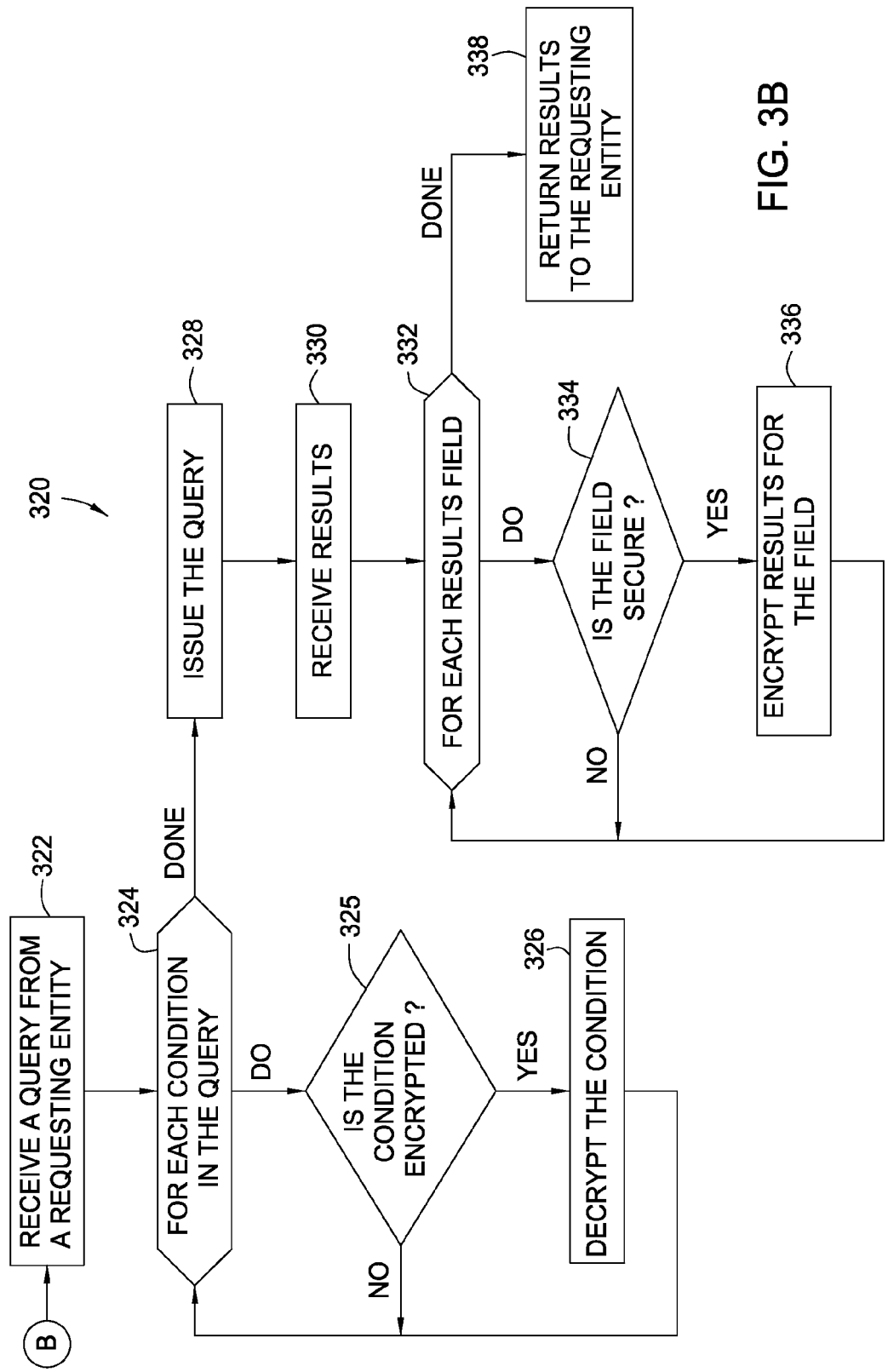
Figure 3C:
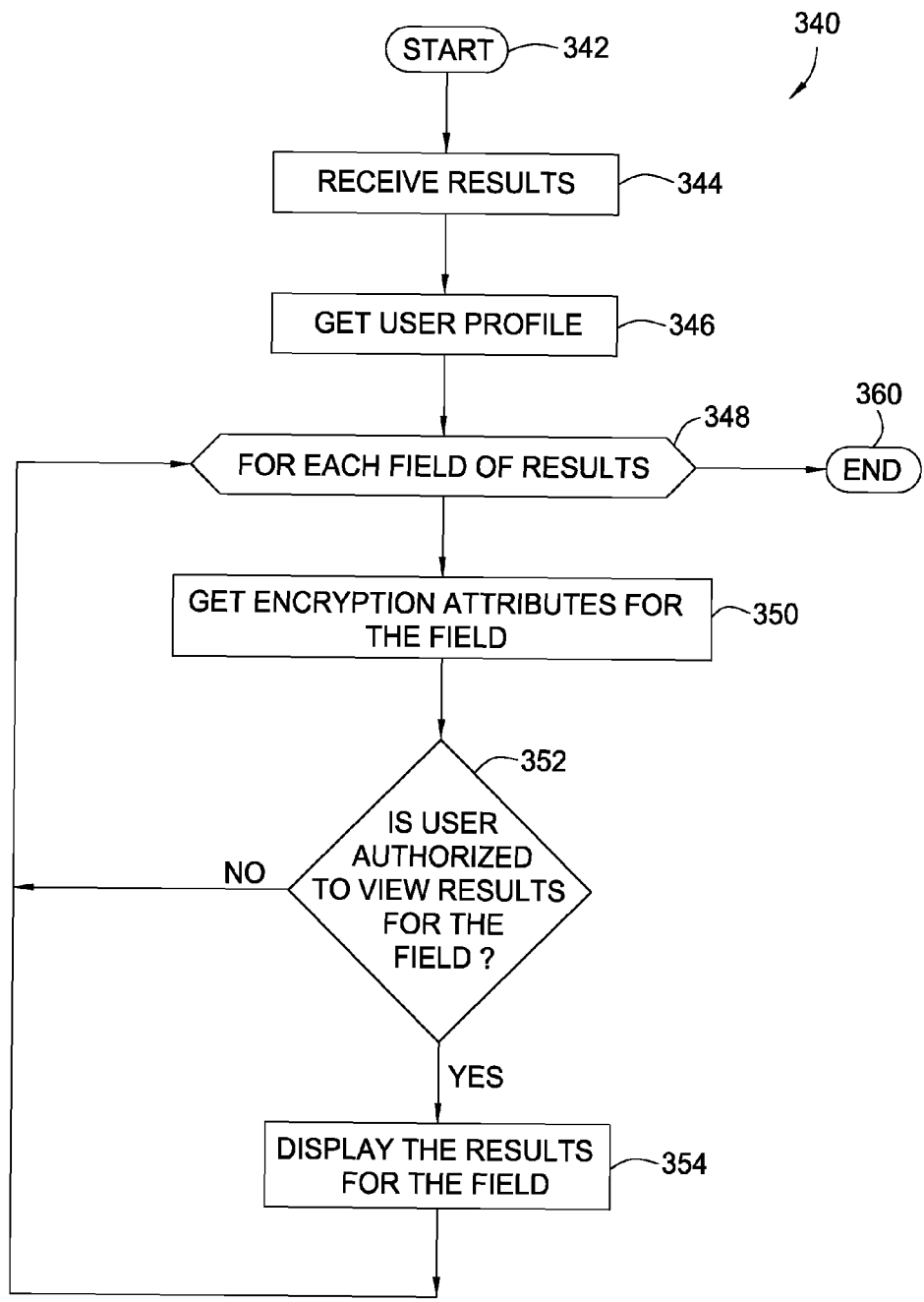

FIGS. 3A-3C illustrate exemplary operations for securing sensitive information in database transactions according to various aspects of the present invention. For example, FIG. 3A illustrates exemplary operations 300 for securing sensitive information by encrypting query conditions involving sensitive logical fields. Illustratively, the operations 300 may be performed by any requesting entity, such as the browser program 122 of the client 102, to encrypt sensitive information contained in a query prior to transmitting the query over the network 126. The operations 300 begin at step 302, for example, by invoking an application (e.g., the browser program 122) from which queries may be built and/or issued. At step 304, the user builds a query.

At step 306, a loop of operations (308-312) is performed for each condition in the query, for example, in preparation for issuing the query. At step 308, encryption attributes (e.g., encryption attributes 216) are retrieved for each field involved in the query condition. At step 310, a determination is made, based on the retrieved encryption attributes, as to whether any of the fields involved in the condition are sensitive fields. For example, if the encryption attributes is a Boolean variable, the determination may entail simply testing to see if encryption is enabled for the corresponding field.

If it is determined that any of the fields involved in the condition are sensitive, the condition is encrypted, at step 312, otherwise the condition is not encrypted. In either case, processing proceeds to step 306 to select the next condition (if any). As illustrated, once the loop of operations 308-312 have been performed for each condition in the query, the query is issued. For example, the query may be transmitted from the client 102 to the server 104 over the network 126.

FIG. 3B illustrates exemplary operations 320 that may be performed, for example, by the server 104 (e.g., the application 140 and/or query execution component 150) receiving the issued query containing encrypted query conditions. The operations 320 begin, at step 322, by receiving the query from the requesting entity (e.g., the browser program 122). At step 324, a loop of operations (steps 325-326) is performed for each condition in the query, in order to decrypt any encrypted conditions. At step 325, a determination is made, as to whether the condition is encrypted. The determination may be made based on an indication provided in the query itself. For example, as indicated in TABLE I, the query may take the form of an XML document and, as illustrated in the query results example shown in TABLE II, in the XML document encrypted data may be tagged as such.

If it is determined that the condition is encrypted, the condition is decrypted at step 326. Well known techniques may be used to enable the server 104 to decrypt the conditions. For example, the client 102 and server 104 may exchange a common set of encryption keys for use in the encrypting/decrypting of data. Processing then proceeds to step 324 to select the next condition (if any). Once each encrypted condition has been decrypted, processing proceeds to step 328 to issue the query (e.g., against the DBMS 154). As previously described, for an abstract data model illustrated, the query execution runtime component 150 may first convert the query from an abstract form into a concrete form compatible with the specific underlying physical representation 214.

In any case, at step 330, results from issuing the query are received and, at step 332, a loop of operations (334-336) are performed to determine if any of the results fields are sensitive. At step 334, a determination is made as to whether the field is secured, for example, by accessing the encryption attribute for the field stored in the DRA component 148. If it is determined that the field is sensitive, the field is encrypted, at step 336, otherwise, the field is not encrypted. In either case, processing proceeds to step 332 to select the next field. Once the operations 334-336 have been performed for each field, the results are returned to the requesting entity, at step 338. For example, as illustrated in FIG. 2C, results 220 including both viewable (non-encrypted) results 222 and encrypted results 224 may be forwarded to the server application 140 to be sent to the client 102 over the network 126.

FIG. 3C illustrates exemplary operations 340 that may be performed by the requesting entity, (e.g., the client 102 or browser program 122) to process the results 220 received from the server 104. The operations 340 begin at step 342, for example, after issuing the query and, at step 344, the results are received. For some embodiments, encrypted results may be simply identified (e.g., indicated or "tagged" in an XML document containing the results) and decrypted by the receiving entity. However, for other embodiments, an additional level of security may be provided, for example, based on user credentials (e.g., indicating whether the user is authorized to view the encrypted results).

Therefore, at step 346, a user profile (e.g., one of the user profiles 153 illustrated in FIG. 1 containing user credentials) is obtained. At step 348, a loop of operations (350-354) is performed for each results field, to determine if the user is authorized to view the results. At step 350, encryption attributes for the field are retrieved. As previously described, the encryption attributes for the field may include, not only whether the field is sensitive, but a security level required to view the results (an authorized user group, etc.). At step 352, a determination is made, based on the encryption attributes and the user profile, as to whether the user is authorized to view the results for the field.

For example, if the encryption attributes indicate the field is not sensitive, the results are not encrypted anyway and, therefore, may be displayed without regard to the user profile. On the other hand, if the field is sensitive (i.e., the results are encrypted), a security level or user group contained in the user profile may be compared against a corresponding encryption attribute to determine if the user is authorized to view the encrypted data. If it is determined the user is authorized to view the results for the field, the results are (decrypted and) displayed, at step 354. As will be described in greater detail below, if the user is not authorized, the remaining (unencrypted or decrypted) results may still be displayed to the user, along with an indication that one or more of the results fields is encrypted and, therefore, not displayed to the user. As an alternative, encrypted fields the user is not authorized to view may be simply be removed from the results set (or not displayed). Regardless, once the operations 350-354 have been performed for all the results fields, the operations 340 are exited at step 360.

Exemplary User Interface

For some embodiments, indication may be provided to a user building a query that one or more fields involved in the query are sensitive and will, therefore, be encrypted. For example, 4A illustrates an exemplary graphical user interface (GUI) screen that may be used to generate queries. As shown, the GUI screen 400 may allow the user to add query conditions and results conditions. In the illustrated query being built, an indication is provided that Patient ID, shown in the results field will be encrypted in the query results.

FIG. 4B illustrates an exemplary GUI screen 450 that may be used to display query results (e.g., from issuing a query built with the GUI screen 400). As shown, an indication is provided that the Patient ID field is encrypted and, therefore data from the field is not displayed (e.g., the data returned for the field is hidden from the user). On the other hand, the other non-sensitive results fields ("Hemoglobin Test Results" and "Date of Test") are displayed.

As previously described, for some embodiments, security may be user or group based and whether a field is displayed to a particular user may be determined by the user's security level (or other credential, such as a user group). As an example of user-based security, a first user (assigned a first security level) may be not be able to view patient IDs in their queries, while a second user (assigned a second security level) may be able to view patient IDs (unencrypted). For example, the patient IDs may be encrypted with the second user's public key such that the second user could decrypt them for viewing.

In some situations, a user's security level may change, allowing them to view encrypted data they were previously unauthorized to view. For example, a researcher looking at data to determine if there is enough data to support a theory may be prohibited from viewing patient IDs, which may not be necessary for the collection of data. However, upon realizing the data may support additional findings, the researcher may request (e.g., of an administrative board) authorization to see Patient IDs in order to identify potential research candidates. Rather than re-run the queries and generate new results, the Patient IDs encrypted in the query results may be decrypted for viewing by the user.

An example of this scenario is illustrated in FIGS. 4B and 4C. In FIG. 4B, the user ("Researcher 1") has a Security Level of 2, which is not adequate to provide authorization to view Patient IDs. In FIG. 4C, however, the user's Security Level has been changed to a Security Level of 1 (a higher security level in this example) which provides sufficient authorization to view the Patient IDs. Accordingly, the Patient IDs, while hidden from the user in FIG. 4B, are displayed to the user in FIG. 4C.

As previously described, for some embodiments, in order to facilitate manipulation of query results, encrypted (sensitive) results fields may be decrypted and stored as temporary results (e.g., temporary results 230 of FIG. 2C). A number of advantages may be gained by storing (completely decrypted) temporary results. For example, if the user's security level changes, as described above, the decrypted results may be readily retrieved from the temporary results.

Another advantage in using temporary results is that the user may build additional queries, based on query results, even though the results are hidden from the user (i.e., the user is not authorized to view the results). As a result, the user may be able to perform complex research, "drilling down" to details related to specific results even without viewing sensitive portions of the results. As an example, a medical researcher may collect a list of patients, for example, with a common disease. While the patient IDs may be hidden from the researcher, the researcher may still be able to build a query based on a patient ID, to gain additional details regarding a particular patient.

Figure 4D:

For example, the researcher may wish to collect a complete list of tests that a patient has previously had performed (e.g., results from an initial query may have indicated a condition that may be verified by additional tests). An example of this scenario is illustrated in FIG. 4B and FIG. 4D. As illustrated in FIG. 4B, a user may be given the option to retrieve a full list of tests performed for a patient whose ID is hidden from the user. If the user exercises this option, as illustrated in FIG. 4D, the user may be provided with the GUI screen 400 already containing the necessary query conditions (based on the hidden field) to return the list of tests. As shown, while the field (Patient ID) may be shown, the conditional information (e.g., Patient ID=123456) is not shown. Thus, the user may know the nature of the query, but not the specific values involved. Of course, while this example is specific to medical research, similar functionality may be provided for other application environments (e.g., a criminal investigator may be allowed to "Retrieve all prior convictions" of a convicted felon without knowing the actual identity of the felon).

Allowing a user to generate and/or issue queries based on sensitive encrypted fields the user is not authorized to view may also be advantageous in various other situations. For example, for some embodiments, in an effort to facilitate the query building process, queries created by one user may be saved for later reuse by another user. By allowing queries to be built without displaying sensitive fields to unauthorized users, queries built by a first user having a first (higher) security level may be reused by a second user having a second (lower) security level. Examples of query reuse are described in the commonly assigned application Ser. No. 10/264,188, entitled "SQL Query Construction Using Durable Query Components," filed Oct. 3, 2002, herein incorporated by reference in its entirety.

CONCLUSION

By partial encryption of database transactions, data that is not sensitive may be transmitted freely across a network, without encryption, thus reducing or eliminating wasteful processing overhead. For some embodiments, database fields containing sensitive information may be identified in a document that may be accessed by a database server and requesting client. The requesting client may access the document to identify sensitive fields that may be encrypted in a query to prevent unauthorized users from extracting information from the query (e.g., correlating the query results to a particular condition). The database server may first access the document to identify fields in a received query that are encrypted and, therefore, need to be decrypted to issue the query against the database. Further, after issuing the query, the database server may access the document to identify sensitive fields in the query results. Only fields in the query results identified as sensitive may be encrypted prior to returning the results. Thus, partial encryption of query results may be particularly advantageous when large amounts (e.g., thousands of rows) of data are returned in a single query, with only a small fraction of the data being sensitive.

While the foregoing is directed to embodiments of the present invention, other and further embodiments of the invention may be devised without departing from the basic scope thereof, and the scope thereof is determined by the claims that follow.

What is claimed is:

1. A computer readable storage medium containing a program which, when executed, performs operations for conducting a secure database transaction, comprising:

receiving a query from a requesting entity, wherein the query was processed by an encryption algorithm configured to selectively encrypt conditions of the query depending on whether the query conditions contained an identified sensitive field;

issuing the query against a database;

receiving results in response to issuing the query;

determining whether the results include data corresponding to one or more sensitive fields;

if so, encrypting the data corresponding to the one or more sensitive fields; and sending the query results to the requesting entity; and prior to issuing the query against the database:
- determining if any conditions included in the query are encrypted; and
- if so, decrypting the encrypted conditions.

2. The computer readable storage medium of claim 1, wherein determining whether the results includes data corresponding to one or more sensitive fields comprises accessing a document identifying one or more fields as sensitive.

3. The computer readable storage medium of claim 1, wherein the document is an XML document.

4. A computer system for conducting secure database transactions, comprising:

a memory containing a query processing component; and a computer processor which, when executing the query processing component, is configured to:
a) receive a query from a requesting entity, wherein the query was processed by an encryption algorithm configured to selectively encrypt conditions of the query depending on whether the query conditions contained an identified sensitive field,
b) determine if the query includes one or more encrypted conditions and, if so, decrypt the one or more encrypted conditions and then issue the query against a database,
c) determine if results received in response to issuing the query against the database contain data corresponding to one or more sensitive fields,
d) if so, encrypt the data corresponding to the one or more sensitive fields, and
e) send the results to the requesting entity.

5. The computer system of claim 4, wherein the requesting entity is configured to:

receive the results;

identify the encrypted data;

determine if a user is authorized to view the encrypted data, based on one or more credentials of the user; and if so, decrypt the encrypted data and present the decrypted data to the user.

6. The computer system of claim 4, wherein the query processing component is configured to determine if one or more fields is sensitive based on security attributes for the one or more fields retrieved from a document.

7. The method of claim 6, wherein: the document contains abstract representations of physical fields of the database; and issuing the query against a database comprises mapping, based on the abstract representations, logical fields contained in the query to physical fields of the database.

* * * * *